[19] United States Patent
Coatney

[11] 3,754,951
[45] Aug. 21, 1973

[54] PERICLASE REFRACTORY GRAIN

[75] Inventor: Richard L. Coatney, Pleasanton, Calif.

[73] Assignee: Kaiser Aluminum & Chemical Corporation, Oakland, Calif.

[22] Filed: July 26, 1971

[21] Appl. No.: 165,919

[52] U.S. Cl. ................................................ 106/58
[51] Int. Cl. ............................................ C04l 35/04
[58] Field of Search ...................................... 106/58

[56] References Cited
UNITED STATES PATENTS

| | | | |
|---|---|---|---|
| 3,106,475 | 10/1963 | Davies et al. | 106/58 |
| 3,298,841 | 1/1967 | Havranek | 106/58 |
| 3,378,383 | 4/1968 | Van Dreser | 106/58 |
| 3,473,939 | 10/1969 | Mayberry et al. | 106/58 |
| 3,520,706 | 7/1970 | Davies et al. | 106/58 |
| 3,573,079 | 3/1971 | Shibasaki et al. | 106/58 |
| 3,582,373 | 6/1971 | Gilpin et al. | 106/58 |
| 3,634,114 | 1/1972 | Lufcy | 106/58 |
| 3,383,226 | 5/1968 | Hildinger et al. | 106/58 |

*Primary Examiner*—James E. Poer
*Attorney*—Paul E. Calrow et al.

[57] ABSTRACT

A high purity periclase (MgO) refractory grain of exceptionally high strength results when the subsidiary constituents of the grain are controlled so that in addition to lime (CaO) and silica ($SiO_2$) compounds, particularly dicalcium silicate, there are present brownmillerite and/or dicalcium ferrite, to the exclusion of other iron and aluminum compounds.

10 Claims, 2 Drawing Figures

INVENTOR.
RICHARD L. COATNEY
BY
ATTORNEY

PERICLASE REFRACTORY GRAIN

BACKGROUND OF THE INVENTION

Massive refractory shapes such as brick are generally made by combining refractory grains, which may be of different chemical compositions, of graded size ranges from, for example, passing a 4 mesh screen down to pulverized grain which passes a 325 mesh screen. Shapes made from such grade-sized refractory grain are generally heated, either in a firing operation or during use, to form a ceramic bond between grains.

In the past, most research into improving the high temperature strengths of refractory shapes has been directed at improving the ceramic bond between the individual grains. In this work, it was early recognized that minor constituents, which might be present as impurities, played a very important role in forming the ceramic bond. In fact, intentional additions of minor constituents have often been made to improve the ceramic bond, or to reduce the firing temperature at which a good ceramic bond forms.

In recent years, particularly because of the high firing of refractories such as periclase and periclase-chrome basic refractories to form a direct bond between grains, it has developed that the limiting strength at high temperatures of a refractory shape made from such materials is determined, not so much by the intergranular bond, but rather by the strength of the refractory grain itself.

Thus, in recent years, attention has turned to the problem of increasing the high temperature strength of refractory grains. For example, it has been found that periclase grain in which dicalcium silicate is the predominant secondary phase has much higher strength at elevated temperatures than, for example, one with merwinite or monticellite as the principal subsidiary phase. The present invention is directed to a refractory grain made predominantly of periclase and having enhanced high temperature strength due to control of the subsidiary constituents of the grain.

SUMMARY OF THE INVENTION

It has now been discovered, according to this invention, that a periclase grain of enhanced high temperature strength is obtained when the subsidiary constituents of the grain are controlled so that substantially all the MgO in the grain is in the form of periclase, substantially all the alumina ($Al_2O_3$) is present in the form of brownmillerite ($4CaO \cdot Al_2O_3 \cdot Fe_2O_3$ or $C_4AF$), and substantially all the iron oxide ($Fe_2O_3$) is present either as brownmillerite or dicalcium ferrite ($2CaO \cdot Fe_2O_3$ or $C_2F$). Under these circumstances, all the silica ($SiO_2$) will be present as either dicalcium silicate ($2CaO \cdot SiO$ or $C_2S$) or tricalcium silicate ($3CaO \cdot SiO$ or $C_3S$), and all the lime (CaO) will be present in the preceding compounds or as free lime.

More particularly, the grain of this invention is a high purity periclase grain containing less than 0.1 percent by weight $B_2O_3$ and consisting essentially of at least 85 percent by weight MgO and, as subsidiary components, CaO, $SiO_2$, $Al_2O_3$, and $Fe_2O_3$, wherein the relative amounts of the subsidiary components are controlled so that there are at least 2 moles of CaO present for each mole of $SiO_2$ plus $Al_2O_3$ plus $Fe_2O_3$, and so that there is at least one mole of $Fe_2O_3$ for each mole of $Al_2O_3$, whereby substantially all the MgO in the grain is present as periclase, substantially all the $SiO_2$ is present as a calcium silicate, substantially all the $Al_2O_3$ is present as brownmillerite, and substantially all the $Fe_2O_3$ is present as either brownmillerite or dicalcium ferrite, and wherein the amounts of the subsidiary components are controlled so that the weight ratio of calcium silicates to iron-containing compounds is between 1:1 and 20:1.

DETAILED DESCRIPTION

Refractory grain according to this invention can be made by various well known techniques. Generally, synthetically produced periclase grain is made from a raw material, for example magnesium hydroxide produced from sea water, which contains as impurities lime, silica, alumina, and iron oxide compounds. When such a raw material is used in the practice of this invention, it will merely be necessary to select a raw material of the requisite purity, and adjust the proportions of the subsidiary constituents, for example by adding lime in the form of calcium carbonate or calcium hydroxide, or by adding iron oxide in one of its many readily available forms.

On the other hand, it is possible to start with a raw material containing substantially all (e.g., 99.9 percent or more) MgO, and to add the subsidiary components in amounts and proportions to form a composition within the scope of this invention. Such additions may be made by means of the simple oxides themselves, or as materials, such as the hydroxides and carbonates, which will yield simple oxides on firing, or they may be added in prereacted form, for example in the form of dicalcium silicate, brownmillerite, and dicalcium ferrite.

It will be appreciated by those skilled in the art that compositions of this invention constitute a five component system, the primary oxide components being MgO, CaO, $SiO_2$, $Al_2O_3$ and $Fe_2O_3$. It is manifestly impossible to represent a five component composition by a three dimensional representation. However, within the scope of this invention, it can be ascertained from well known phase relationships, that substantially all the MgO in the composition will be in the periclase phase. Conversely, this periclase phase will contain substantially none of the subsidiary constituents of the composition, the solid solution of these materials in magnesium oxide being negligible. Likewise, when it is said that substantially all the MgO will be in the periclase phase, it will be understood that the amount of MgO in solid solution in the subsidiary phases is negligible.

Thus, so far as the four subsidiary components (CaO, $SiO_2$, $Al_2O_3$, and $Fe_2O_3$) are concerned, the relative amounts of these can be represented by a solid compositional tetrahedron wherein each apex of the tetrahedron represents 100 percent of one of the four components, each edge of the tetrahedron represents binary mixtures of the two components represented by the end points of the edge, each point on the face of the tetrahedron represents a composition made of the three constituents represented by the three points of the tetrahedron forming the face, and any point within the tetrahedron represents a composition containing all four constituents.

Figure 1:
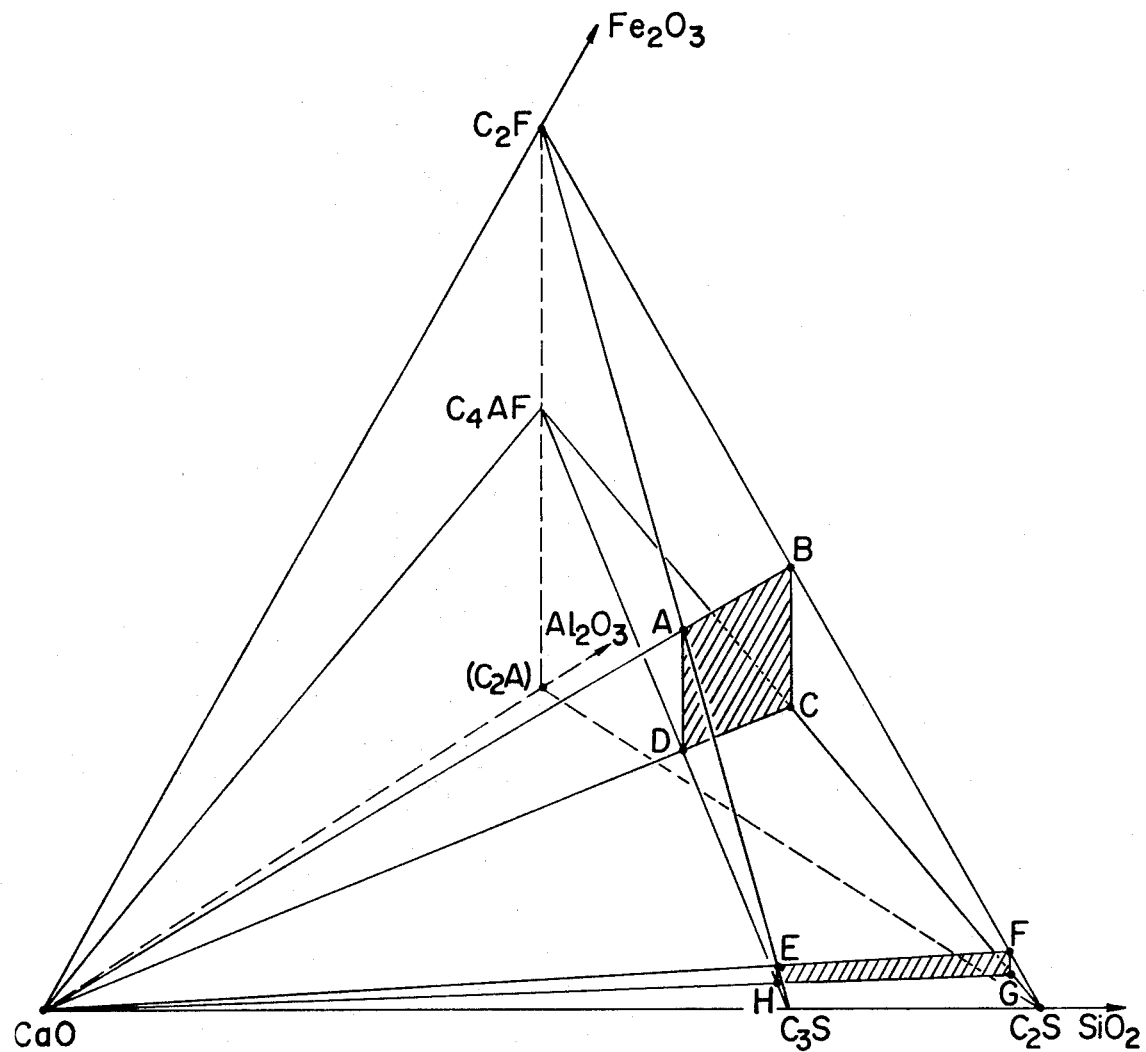
FIG. 1 is a two-dimensional representation of a solid, three-dimensional, composition figure, being a portion of the $CaO-SiO_2-Al_2O_3-Fe_2O_3$ composition tetrahedron.

FIG. 1 is a representation of a portion of such a composition tetrahedron, specifically the portion of the $CaO-SiO_2-Al_2O_3-Fe_2O_3$ composition tetrahedron near the CaO apex. In FIG. 1, intermediate compounds are designated by a chemical shorthand in which C stands for CaO, S stands for $SiO_2$, A stands for $Al_2O_3$, and F stands for $Fe_2O_3$. Thus, for example, dicalcium silicate ($2CaO \cdot SiO_2$) is abbreviated $C_2S$.

The condition that compositions according to this invention contain at least 2 moles of CaO for each mole of $SiO_2$ plus $Al_2O_3$ plus $Fe_2O_3$ is represented by the fact that in FIG. 1 compositions according to this invention lie within or on the composition tetrahedron somewhere between the CaO apex and the plane labeled $C_2S-C_2F-C_4AF-(C_2A)$.

(The point $C_2A$ is shown in parentheses on the drawing because, as will be recognized by those skilled in the art, a compound corresponding to the formula $C_2A$ does not in fact exist, this point and the lines to it being shown on the drawing merely for purposes of illustrating the scope of this invention. Since, as is pointed out in the next paragraph, the compositions of this invention lie nowhere near the point labeled ($C_2A$), it is believed that discussion of the well known phase relationships in that portion of the composition tetrahedron is unnecessary.)

The further condition that compositions according to this invention contain at least 1 mole of $Fe_2O_3$ for each mole of $Al_2O_3$ is represented on the drawing by the fact that points representing compositions according to this invention will lie on or within the composition tetrahedron between the plane labeled $CaO-C_4AF-C_2S$ and the plane labeled $CaO-C_2F-C_2S$. In other words, compositions according to this invention can be represented by points on or within a subsidiary composition solid defined by the four apices labeled CaO, $C_4AF$, $C_2F$ and $C_2S$ on the drawing.

As has already been disclosed, the compositions of this invention which show enhanced high temperature strength are those wherein the weight ratio of the calcium silicate compounds, $C_2S$ and $C_3S$, (and also CaO, if present) to the iron-containing compounds, $C_4AF$ and $C_2F$, is between 20:1 and 1:1. In FIG. 1, the plane within the $C_2F-C_4AF-C_2S-CaO$ tetrahedron labeled A-B-C-D-CaO, represents compositions having the limiting ratio of calcium silicate compounds to iron-containing compounds of 1:1. Similarly, the plane labeled E-F-G-H-CaO in the drawing represents compositions having the 20:1 limiting ratio of calcium silicate compounds to iron-containing compounds.

It can be seen that compositions represented by points near the CaO apex will consist of tricalcium silicate, dicalcium ferrite, brownmillerite, and free lime. From a practical point of view, the presence of any significant amount of free lime in the refractory grain may result in its hydration during storage and use. Therefore, to avoid this problem, the compositions of grains of this invention will preferably be confined to the composition solid defined by the points $C_2S-C_3S-C_4AF-C_2F$. In other words, the composition volume enclosed by the points A-B-C-D-E-F-G-H represents compositions according to a preferred form of this invention wherein none of the CaO is present as free lime.

As will become evident from the examples given below, a particularly preferred set of compositions according to this invention is that in which the calcium silicate subsidiary components are predominantly (i.e., over 50 percent by weight), and most preferably substantially all, dicalcium silicate, together with brownmillerite or dicalcium ferrite or both of these latter two. In other words, compositions according to this most preferred form of the invention lie on the composition triangle $C_2S-C_2F-C_4AF$ of the drawing, and more specifically on the plane bounded by the points B-C-G-F.

While it is usually desirable to secure chemical equilibrium among the components forming a refractory grain, in practice complete equilibrium may not always be reached. Furthermore, it is possible that a small amount of solid solution may occur between the various subsidiary components. In the case of subsidiary phases in compositions according to this invention, it is not yet possible, because of the very small amounts of the subsidiary components present, to establish experimentally the presence or absence of solid solution. Therefore, the composition solid of the drawing and the various compounds represented thereon may be considered to be normative compositions which may not correspond exactly to the chemical composition of phases actually found in the periclase grain of this invention. However, it is clear that specification of the amounts of these normative phases uniquely specifies the composition of the grain.

EXAMPLES

It will be appreciated by those skilled in the art that the compositions of this invention are free of spinel materials such as magnesium aluminate ($MgO \cdot Al_2O_3$ or MA) and magnesium ferrite ($MgO \cdot Fe_2O_3$ or MF).

Compositions according to this invention were made by taking the amount of chemically pure (99.9 percent MgO) magnesium oxide shown in Table I and admixing with it, by blending in an acetone slurry, the requisite amounts of silica, calcium carbonate, alumina, and iron oxide or chromium oxide to form the subsidiary compounds shown in Table I. All materials used were of a fineness such that substantially all the material passed a 325 mesh screen. The various admixtures were isostatically pressed into cylinders about 4 inches long by 1 inch in diameter. These were fired at a temperature of 1,600°C for 6 hours, producing cylinders about 2½ inches long by ¾ inch diameter. From these fired cylinders, specimens 0.65 inch long by 0.40 inch diameter were machined. These machined specimens were tested for compressive strength at 1,500°C, with the results shown in Table I. The data in Tables I and II are averages, usually for three specimens of the same composition, sometimes for four specimens, but in any case for at least two specimens. All the specimens had, after firing, a $B_2O_3$ content of less than 0.1 percent by weight.

From the data in Table I, it can be seen that the addition of 2 percent dicalcium silicate ($C_2S$) increases the high temperature strength of periclase from some 6,000 psi to over 17,000 psi (specimen 2). Similarly, the addition of 2 percent tricalcium silicate ($C_3S$) to the periclase increases its strength to over 19,000 psi (specimen 18). Both of these effects were to be expected from previous work.

Examination of specimens 10 and 17 indicates that the addition of 2 percent dicalcium ferrite ($C_2F$) has

TABLE I

| Specimen | MgO | $C_2S$ | $C_3S$ | $C_4AF$ | $C_2F$ | Strength (p.s.i.) | Porosity, percent | Crystal size ($\mu$) |
|---|---|---|---|---|---|---|---|---|
| 1 | 100 | | | | | 6,200 | 5.9 | 40 |
| 2 | 98 | 2.00 | | | | 17,200 | 7.6 | 20 |
| 3 | 98 | 1.83 | | 0.17 | | 21,700 | 11.2 | 10 |
| 4 | 98 | 1.67 | | 0.33 | | 23,400 | 11.2 | 10 |
| 5 | 98 | 1.50 | | 0.50 | | 24,800 | 7.8 | 20 |
| 6 | 98 | 1.50 | | 0.50 | | 28,200 | 6.8 | 10 |
| 7 | 98 | 1.33 | | 0.67 | | 22,800 | 10.5 | 10 |
| 8 | 98 | 1.00 | | 1.00 | | 10,600 | 3.7 | 35 |
| 9 | 98 | 0.50 | | 1.50 | | 2,400 | 4.1 | 45 |
| 10 | 98 | | | 2.00 | | 2,800 | 5.0 | 100 |
| 11 | 98 | 1.83 | | | 0.17 | 20,800 | 10.0 | 10 |
| 12 | 98 | 1.67 | | | 0.33 | 21,900 | 10.2 | 10 |
| 13 | 98 | 1.50 | | | 0.50 | 25,300 | 7.6 | 20 |
| 14 | 98 | 1.33 | | | 0.67 | 22,700 | 9.9 | 15 |
| 15 | 98 | 1.00 | | | 1.00 | 18,200 | 9.3 | 15 |
| 16 | 98 | 0.50 | | | 1.50 | 5,500 | 3.3 | 130 |
| 17 | 98 | | | | 2.00 | 6,000 | 3.3 | >150 |
| 18 | 98 | | 2.00 | | | 19,100 | 7.0 | 25 |
| 19 | 98 | | 1.50 | 0.50 | | 19,900 | 7.0 | 20 |
| 20 | 98 | | 1.50 | | 0.50 | 19,100 | 6.7 | 20 |

TABLE II

| Specimen | MgO | $C_2S$ | $C_2K$ | $C_3K$ | Strength (p.s.i.) | Porosity, percent | Crystal size ($\mu$) |
|---|---|---|---|---|---|---|---|
| A | 98 | 1.83 | 0.17 | | 21,300 | 10.3 | 10 |
| B | 98 | 1.67 | 0.33 | | 21,860 | 12.1 | 10 |
| C | 98 | 1.33 | 0.67 | | 17,300 | 16.1 | 10 |
| D | 98 | 1.00 | 1.00 | | 17,200 | 17.6 | 15 |
| E | 98 | | 2.00 | | 3,000 | 3.3 | 25 |
| F | 98 | 1.83 | | 0.17 | 21,100 | 11.2 | 6 |
| G | 98 | 1.67 | | 0.33 | 20,900 | 12.5 | 8 |
| H | 98 | 1.33 | | 0.67 | 19,800 | 14.8 | 10 |
| J | 98 | 1.00 | | 1.00 | 15,500 | 12.8 | 15 |
| K | 98 | | | 2.00 | 2,000 | 3.3 | 20 | substantially no effect on the strength of pure periclase, whereas the addition of 2 percent brownmillerite ($C_4AF$) decreases the strength by more than half. Accordingly, it is surprising that, as shown by specimens 3 to 7 and 11 to 17, the addition of either brownmillerite or dicalcium ferrite together with dicalcium silicate to the MgO results in even greater enhancement of the high temperature strength, namely to a value more than four times that found for the pure MgO and about 50 percent higher than that found for MgO with the addition of dicalcium silicate alone.

Specimens 19 and 20 demonstrate that, while the addition of brownmillerite or dicalcium ferrite to tricalcium silicate does not result in such a dramatic increase in strength compared to specimens with the tricalcium silicate addition alone, these additions do not, as might be expected from their effect on periclase alone, impair the high temperature strength of periclase containing tricalcium silicate.

The data on the average crystallite size in each specimen given in Table I might suggest that some of the low strength of specimens 10 and 17 was due to unusually large crystallites in these specimens. However, this effect would be offset by the fact that specimens 10 and 17 were among those with the lowest porosity. In any case, the highest strength specimens, 6 and 13, had average crystallite size and were of higher porosity, suggesting that even higher strengths might be obtained with lower porosity.

Specimens A to K, the compositions of which are indicated in Table II, were prepared in the same way as the preceding specimens, using pigment grade $Cr_2O_3$ as the source of chrome. These specimens, which contain dicalcium silicate and either dicalcium chromate ($2CaO \cdot Cr_2O_3$ or $C_2K$) or tricalcium chromate ($3CaO \cdot Cr_2O_3$ or $C_3K$), indicate that chromium can be substituted for iron in compositions within the limits of this invention.

Figure 2:
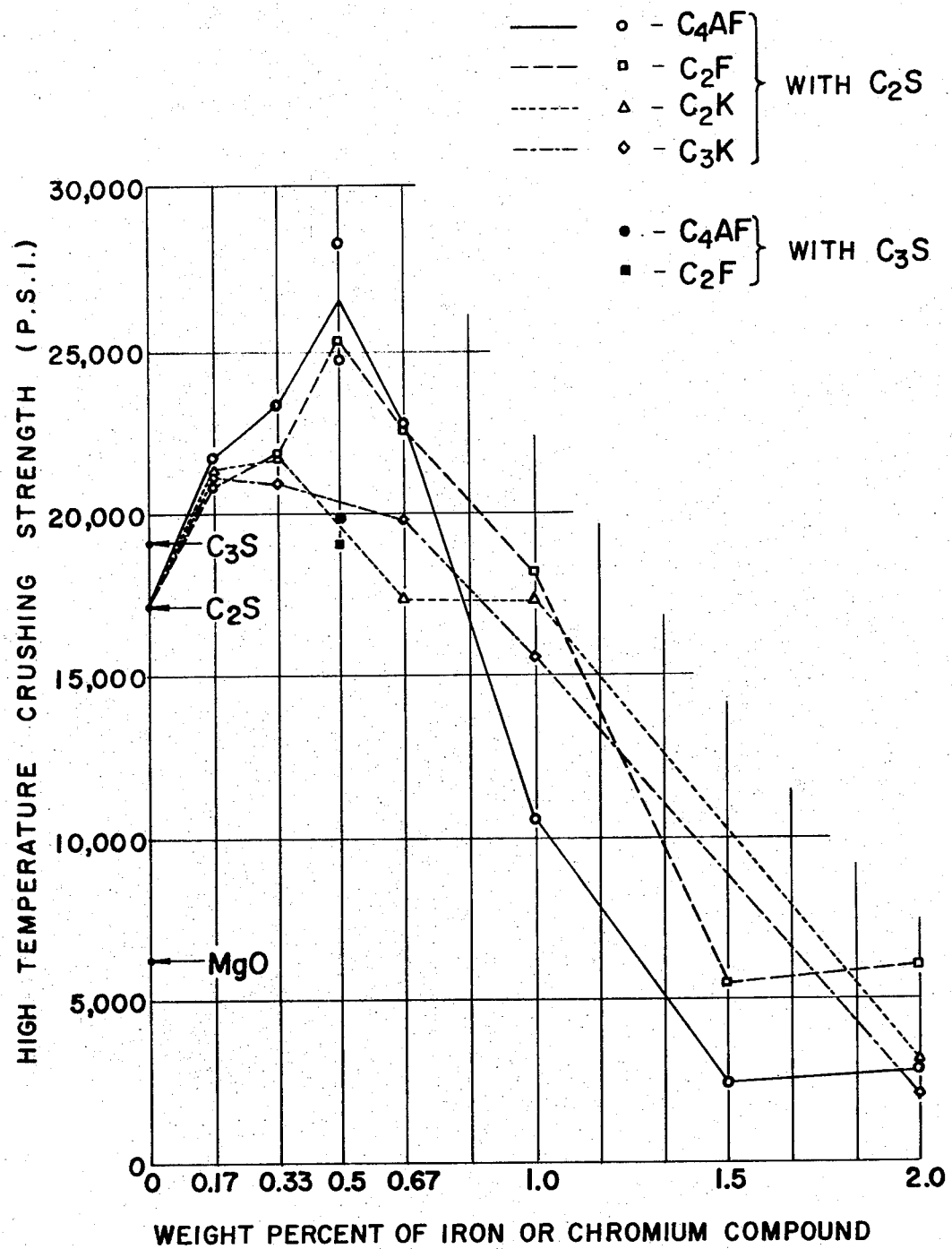
FIG. 2 is a graph of high temperature strength versus composition for various compositions shown in Table I below.

FIG. 2 is a plot of strength versus composition for the compositions shown in Tables I and II. The open symbols represent compositions containing dicalcium silicate and/or dicalcium ferrite, brownmillerite, dicalcium chromate, or tricalcium chromate. The solid points represent compositions with tricalcium silicate and/or dicalcium ferrite or brownmillerite. The figure illustrates clearly the enhancement in strength as the iron-containing compounds are added to the dicalcium silicate secondary phase, and that the strength drops off very rapidly when the ratio of the iron-containing compounds to dicalcium silicate exceeds 1:1.

FIG. 2, and the specimens on which it is based, clearly show that grains with the maximum strength are achieved when the weight ratio of calcium silicates to iron (or chromium) containing compounds (brownmillerite and dicalcium ferrite) is between 2:1 (0.67 percent of the iron-containing compound in FIG. 2) and 5:1 (0.33 percent of the iron-containing compound in FIG. 2). It is also evident that maximum strengths are obtained with a weight ratio of calcium silicates to iron-containing compounds of 3:1 (0.5 percent iron-containing compounds in FIG. 2).

Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 200 mesh to 74 microns.

What is claimed is:

1. A high purity periclase grain containing less than 0.1 percent by weight $B_2O_3$ and consisting essentially of at least 98 percent by weight MgO, and, as subsidiary components, CaO, $SiO_2$, $Al_2O_3$ and $Fe_2O_3$, wherein the relative amounts of the subsidiary components are controlled so that there are from 2 to 3 moles of CaO present for each mole of $SiO_2$ plus $Al_2O_3$ plus $Fe_2O_3$, and so that there is at least one mole of $Fe_2O_3$ for each mole of $Al_2O_3$, whereby substantially all the MgO in the grain is present as periclase, substantially all the $SiO_2$ is present as a calcium silicate, substantially all the $Al_2O_3$ is present as brownmillerite, and substantially all the $Fe_2O_3$ is present as either brownmillerite or dicalcium ferrite, and wherein the amounts of the subsidiary components are controlled so that the weight ratio of calcium silicates to iron-containing compounds is between 2:1 and 5:1.

2. A periclase grain according to claim 1 wherein to weight ratio of calcium silicates to iron-containing compounds is about 3:1.

3. A periclase grain according to claim 1 wherein the amount of dicalcium silicate by weight exceeds the amount of tricalcium silicate by weight.

4. A periclase grain according to claim 3 wherein the weight ratio of calcium silicates to iron-containing compounds is about 3:1.

5. A periclase grain according to claim 3 wherein there are substantially 2 moles of CaO present for each mole of $SiO_2$ plus $Al_2O_3$ plus $Fe_2O_3$, whereby substantially all the $SiO_2$ is present as dicalcium silicate.

6. A periclase grain according to claim 5 wherein the weight ratio of dicalcium silicate to iron-containing compounds is about 3:1.

7. A periclase grain according to claim 5 which is substantially free of $Al_2O_3$ and wherein substantially all the iron is present as dicalcium ferrite.

8. A periclase grain according to claim 7 wherein the weight ratio of dicalcium silicate to dicalcium ferrite is about 3:1.

9. A periclase grain according to claim 5 wherein substantially all the $Al_2O_3$ and $Fe_2O_3$ are present as brownmillerite.

10. A periclase grain according to claim 9 wherein the weight ratio of dicalcium silicate to brownmillerite is about 3:1.

* * * * *